United States Patent
Robinson et al.

(10) Patent No.: US 7,561,572 B2
(45) Date of Patent: Jul. 14, 2009

(54) SYNTHESIS OF GLOBAL TRANSACTION TAGS

(75) Inventors: Trevor A. Robinson, Austin, TX (US); Mark Bradley Davis, Austin, TX (US)

(73) Assignee: Newisys, Inc., San Jose, CA (US)

(*) Notice: Subject to any disclaimer, the term of this patent is extended or adjusted under 35 U.S.C. 154(b) by 681 days.

(21) Appl. No.: 11/185,547

(22) Filed: Jul. 20, 2005

(65) Prior Publication Data
US 2007/0019648 A1    Jan. 25, 2007

(51) Int. Cl.
*H04L 29/02* (2006.01)
(52) U.S. Cl. .................. 370/392; 370/329; 370/338
(58) Field of Classification Search ............... 370/392, 370/329, 338, 420, 395; 709/243, 245, 238
See application file for complete search history.

(56) References Cited
U.S. PATENT DOCUMENTS
6,658,481 B1 * 12/2003 Basso et al. ............ 709/243
2003/0037166 A1 * 2/2003 Ueno et al. ............ 709/238
2005/0021857 A1 * 1/2005 Balassanian ............ 709/245
2006/0168477 A1 * 7/2006 Johnson et al. ............ 714/37

* cited by examiner

*Primary Examiner*—Dang T Ton
*Assistant Examiner*—Pamit Kaur

(57) ABSTRACT

A method for facilitating tracking of packets through a plurality of localized transaction-tagging domains comprises determining a local tag applied within a first localized transaction-tagging domain to an output packet of the first localized transaction-tagging domain and assigning a system-generated global transaction tag to the output packet dependent upon the local tag. Assigning is performed in response to successfully performing the determining. The global transaction tag information is re-applied to an output packet of a second localized transaction-tagging domain after the packet is generated by the second localized transaction-tagging domain. The global transaction tag is a unique identifier that identifies all packets associated with a particular transaction globally across a plurality of localized transaction-tagging domains.

19 Claims, 1 Drawing Sheet

SYNTHESIS OF GLOBAL TRANSACTION TAGS

FIELD OF THE DISCLOSURE

The disclosures made herein relate generally to facilitating hardware simulations and, more particularly, to methods configured for enabling prediction of simulation output.

BACKGROUND

There are two important aspects of developing application-specific integrated circuit (ASIC) simulation and verification environments. One such aspect is that given the input to a device under test (DUT), one must be able to predict the output such that the simulation environment can check (or scoreboard) the predicted output versus the actual output to provide for the determination of correct operation of the DUT. Another such aspect is that, as ASICs gain complexity, human debuggability of simulations becomes a core concern. Many types of ASIC simulations have significant randomness in their stimulus (to gain coverage), may have large run-times, and have complex processing, resulting in simulations that are very complex to debug when simulation output mismatches occur. Thus, increasing the debuggability of simulations becomes a core contributor to the productivity of an ASIC development team.

Many ASICs and ASIC simulations are packet oriented. Examples of packet oriented ASIC simulations are router devices where the DUT performs straightforward routing and possibly minor content manipulation of packets as they traverse the DUT. Often, the DUT will internally re-order packets (i.e., injected packet stimulus) causing a simple packet expectation to not be possible. When developing simulation and verification environments for these types of DUTs, the common problem is how to correlate expected packet output with injected packet stimulus.

A conventional technique for carrying out such correlation is to use all the fields within the packet that are expected not to be modified in the DUT traversal to create a unique temporal signature for the packet. By carefully constructing the packet stimulus, one can create the desired interesting functional stimulus of the DUT and guarantee that the packet stimulus satisfies a temporal signature uniqueness property. The temporal signature refers to a tag of a specific bit pattern that is only valid for a specific span of time, usually until it is received and processed by the output processing side of the simulation. Thereafter, that specific bit pattern can be re-used for another transaction tag. In this manner, the simulation environment can pair up packet stimulus with observed packet output from the DUT during scoreboard processing to achieve packet checking and enables human debugging mechanism by providing means for identification and correlation of packets when debugging the ASIC simulation.

This technique of creating a unique temporal signature, however, is not applicable to DUTs that perform arbitrary processing and re-mapping on the incoming packets, such as that performed by transaction-oriented ASICs. For example, in a typical transaction flow of a probe filtering unit (PFU), debugging of a corresponding ASIC simulation has a number of adverse considerations. One adverse consideration is that packets output by the DUT may not have any obvious correlation to the input packet (e.g., the DUT may receive a packet of type A, but output a packet of type B). Another adverse consideration is that, even though the packets contain a tag, sophisticated DUTs may retag the packet during processing, causing the output packets seen by the simulation environment not to be correlatable to the input packets. Retagging of the packets creates problems for the simulation environment because the simulation environment is then unable to compute the correctness of the generated DUT output because it can't stitch together a cohesive transaction from the observed packet outputs. Additionally, such retagging creates problems for developers because there is no sub-string to search for in simulation logs causing there to be insufficient information for allowing packets to be reliably assigned to the transactions that they compose. Thus, based on these adverse considerations and their resulting drawbacks, the effectiveness of this technique of creating a unique temporal signature has limitations with respect to transaction-oriented ASICs.

Conventional approaches for facilitating simulation of transaction-oriented ASICs often include checkers (i.e., functions for checking expected results) that look at the end results of a transaction. For example, in the case of cache coherency processing ASICs, a shadow memory checker would be utilized for ensuring that cache coherency is maintained. In this manner, the end result is checked, but the individual transactions and packets cannot be checked. Furthermore, humans have a very hard debugging problem without having synthesized global transaction tags.

For behavioral simulations (i.e., non-register transfer level simulations), a conventional approach to facilitating such simulation is to extend the packet in the software simulation to have a globally unique transaction tag. The behavioral simulations can be modified so that as the packets flow across the behavioral DUT, it carries across the transaction tag from the input packet to the generated packets. The transaction tag is generated by the simulation environment to be globally unique in the simulation (such as an incremented transaction counter). In this manner, simulation checkers can be developed to correlate and score transactions, and the transaction tag is output by simulation logging to allow humans to "easily" debug simulations. However, this technique is often not possible with the actual register transfer level (RTL) simulation because the RTL simulation defines the actual signals and actual synthesizable logic for the ASIC and the size of a packet generally cannot be extended to include debug-oriented data.

Therefore, an approach for facilitating simulation and/or lab bring-up of transaction-oriented hardware in a manner that overcomes drawbacks associated with conventional approaches for facilitating simulation and/or lab bring-up of transaction-oriented hardware would be useful, advantageous and novel.

SUMMARY OF THE DISCLOSURE

ASIC simulation environments are becoming more transaction oriented, and the simulation tools have more transaction-oriented features. However, methods and equipment in accordance with the present invention provide for a working transaction model by creating a system-generated global transaction tag (i.e., a synthesized global transaction identifier) to packets of information. The system-generated global transaction tag enables unification of disparate packets into a global transaction. Thus, methods and equipment in accordance with the present invention enable hardware simulation and lab bring-up in a manner that allows output from a localized transaction-tagging domain (e.g., an ASIC under test in a simulation environment, a microprocessor in a multi-processor system, etc) to be predicted.

Through such prediction of output, methods and equipment in accordance with the present invention enables simulations to be efficiently debugged by humans. This capability is an advantageous and distinguishing aspect of localized transaction-tagging domains because conventional approaches to analysing transactions in a localized transaction-tagging domain do not readily and effectively provide for human debugging. Increasing debuggability of simulations, particularly complex ASIC simulations, is a core contributor to productively and effectively carrying out such simulations.

In one embodiment of the present invention, a method for facilitating tracking of packets through a plurality of localized transaction-tagging domains comprises determining a local tag applied within a first localized transaction-tagging domain to an output packet of the first localized transaction-tagging domain and assigning a system-generated global transaction tag to the output packet dependent upon the local tag. Assigning the system-generated global transaction tag is performed in response to successfully performing determination of the local tag.

In another embodiment of the present invention, a method is configured for facilitating tracking of packets through a plurality of processors each connected to a respective one of a plurality of scalable coherent controllers. The sub-networks formed by the interconnection of processors to a particular coherent controller, as well as the sub-network formed by the interconnection of all coherent controllers in the system, each represent a localized transaction-tagging domain. The method comprises determining a local tag applied by a node within a localized transaction-tagging domain (i.e. a processor or scalable coherent controller) to an output packet of that node and assigning a system-generated global transaction tag to the output packet dependent upon the local tag. Assigning the system-generated global transaction tag is performed in response to successfully performing determination of the local tag.

In another embodiment of the present invention, a trace data post processing utility is configured for accessing trace data associated with a scalable coherent controller and a plurality of processors connected to the scalable coherent controller. The scalable coherent controller implements an interface between a plurality of localized transaction-tagging domains. The trace data post processing utility comprises instructions configured for facilitating determination of associated transaction state from the local tag of the input packet from a first localized transaction-tagging domain (i.e. the first localized transaction tag) and instructions configured for facilitating assignment of a new local tag to any output packets entering into a second localized transaction-tagging domain (i.e. the second localized transaction tag). Facilitating assignment of the second localized transaction tag is performed in response to successfully performing determination of the transaction associated with the first localized transaction tag.

Turning now to specific aspects of the present invention, in at least one embodiment, assigning includes applying global transaction tag information to the packet.

In at least one embodiment of the present invention, the global transaction tag information is re-applied to an output packet of a second localized transaction-tagging domain after the second localized transaction-tagging domain generates the packet.

In at least one embodiment of the present invention, the global transaction tag is a unique identifier that identifies all packets associated with a particular transaction globally across a plurality of localized transaction-tagging domains.

In at least one embodiment of the present invention, determining a local tag applied within a first localized transaction-tagging domain includes tracking localized tag re-mapping information in devices bridging transaction-tagging domains for enabling association of a local tag of an input packet from one transaction-tagging domain with the local tag of an output packet entering into another transaction-tagging domain.

In at least one embodiment of the present invention, determining a local tag applied within a first localized transaction-tagging domain includes matching the output packet with a corresponding input packet of the first localized transaction-tagging domain dependent upon the localized tag re-mapping information and assigning is performed in response to successful completion of the matching.

In at least one embodiment of the present invention, trace data is extracted from each one of a plurality of processors, wherein such extraction includes analysing a plurality of packets for identifying output packets from a particular one of said processor.

In at least one embodiment of the present invention, trace data is extracted from the DUT to determine the correspondence among localized transaction tags in different tagging domains.

In at least one embodiment of the present invention, transaction information of an output packet is organized with transaction information of other output packets dependent upon system-generated global transaction tags of the output packets thereby enabling creation of a system global transaction log for the plurality of scalable coherent controllers and processors.

These and other objects, embodiments, advantages and/or distinctions of the present invention will become readily apparent upon further review of the following specification, associated drawings and appended claims.

DETAILED DESCRIPTION OF THE DRAWING FIGURES

Figure 1:
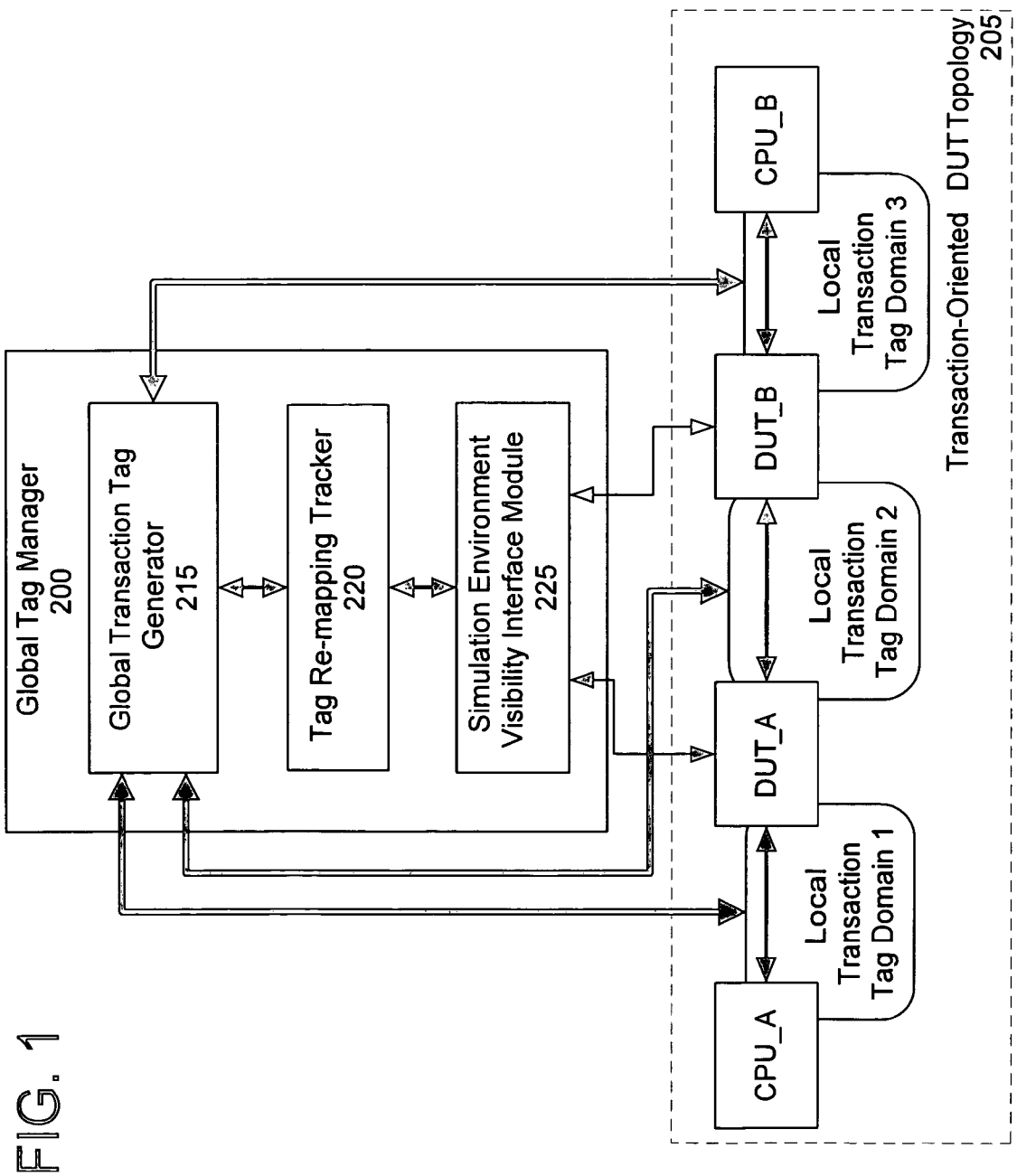
FIG. 1 depicts an embodiment of a stimulation manager in accordance with the present invention.

The present invention is useful in enabling transactions in a hardware simulation or actual hardware system to be tracked and predicted. In particular, embodiments of the present invention are configured for enabling such tracking and prediction of transaction-oriented hardware where retagging of output packets relative to corresponding input packets is performed by transaction-oriented hardware. Examples of such transaction-oriented hardware include, but are not limited to, a Device Under Test (DUT) in a simulation (e.g., a transaction-oriented ASIC), a processor connected to a scalable coherent controller in a multi-processor hardware system and the like.

In a transaction-oriented DUT in the context of the present invention, a transaction performs a function, which may involve a potentially large number of individual packet flows to perform the transaction. A global transaction tag mechanism in accordance with the present invention uniquely identifies all the individual packet flows that comprise the transaction by globally tagging the transaction sequence across transaction-oriented hardware so that the transaction can be understood at a transaction level rather than being seen as unrelated packet flows. In many instances, a single packet flows between two transaction-oriented hardware components, which may each be a localized packet retagging domain. Examples of transaction-oriented hardware include, but are not limited to, a central processing unit (CPU) and an ASIC.

Such a transaction may have any number of particular characteristics. One characteristic is receiving a packet that indicates the start of the transaction. Another characteristic is providing for internal processing that includes the maintenance of state related to the transaction being performed. Another characteristic is issuing one or more output packets based upon the incoming packet and accumulated state for the transaction. Still another characteristic is providing some form of tagging mechanism that is built into the packets to allow the packets to be correlated into a transaction. In the case of a scalable coherent controller, the tags themselves are changed as the packets flow across the scalable coherent controller. Lastly, there is the characteristic that, after going through one or more packet processing sequences related to the transaction, the transaction is concluded at some point and an internal state for the transaction is retired.

Accordingly, debugging of ASIC simulations for transaction-oriented DUTs has a number of challenges. However, as will be discussed in greater detail below, embodiments of the present invention are configured for overcoming such challenges. One such challenge is that of packets output by a DUT not having an obvious correlation to a respective the input packet (e.g., the DUT may receive a packet of type A, but output a packet of type B). Another such challenge is that, even though the packets contain a tag, a sophisticated DUT may retag packets during processing, causing the output packets seen by a simulation environment to not be correlatable to the input packets. Output packets not being correlatable to respective input packets creates another challenge for the simulation environment because it is unable to compute the correctness of the generated DUT output as a result of not being able to stitch together a cohesive transaction from the observed packet outputs. Not being able to stitch together a cohesive transaction from the observed packet outputs creates a challenge for developers because there is no sub-string to search for in simulation logs due to there being insufficient information to allow packets to be reliably assigned to the transactions that the developer composed. Additionally, not being able to stitch together a cohesive transaction from the observed packet outputs creates the problem that simulation scoreboarding and checking can't be performed on the entire transaction.

The present invention advantageously enables facilitation of register transfer level (RTL) simulations in a manner that overcomes limitations associated with conventional approaches for facilitating simulations of transaction-oriented hardware (e.g., ASICs). More specifically, facilitating RTL simulations in accordance with the present invention is distinctive over conventional approaches as it overcomes limitations stemming from the size of a packet not being extendable to include debug-oriented data. The RTL simulation defines the actual signals, timing, and synthesizable logic for the ASIC, thus generally precluding the size of a packet from being extendable.

Given the input to a DUT, one must be able to predict the output such that the simulation environment can check (or scoreboard) the predicted output versus the actual output to provide for the determination of correct operation of the DUT. To this end, the present invention provides for visibility to see packets that are going into the DUT (i.e., input packets) and to garnish information about internal state and processing by the DUT. With this information, output of the DUT (i.e., the output packets) is generally predictable.

Packets are processed as part of a larger transaction. The transaction itself may maintain state within the DUT that will change how incoming packets are processed. Accordingly, through simulation, the packets are monitored going into the DUT and a mechanism in accordance with the present invention (e.g., one or more simulation environment visibility interfaces) is used to either snoop or model an internal state of the DUT. A prediction mechanism in accordance with the present invention is used to compute what packets should come out of the DUT. These predicted packets go into a scoreboard. As actual packets come out of the DUT, they get matched up with the predicted packets in the scoreboard. The scoreboard matches (and removes) packets as the expected packets match the predicted packets. If a packet comes out of the DUT that was not predicted (and is thus not in the scoreboard), then a simulation error is flagged. Following is an example of such tracking and prediction of transaction-oriented hardware packet tracking functionality in accordance with the present invention.

EXAMPLE

Global Transaction Tag Synthesis for Enabling Packet Tracking Functionality in Transaction-Oriented Hardware An input packet (Cmd_WrSized) is sent from a CPU (box1.cpu0.bu0) to a scalable coherent controller DUT (box1.horus). Horus, which is commercially available from Newisys Incorporated, is an example of a scalable coherent controller in accordance with the present invention. An example of an input packet in accordance with the present invention is configured as:

Time 50->0 From system.box1.cpu0.bu0 To system.box1.horus Pkt [fe 100ccc3800790d]:[GlobalTag=24,Command=Cmd_WrSized,SrcNode=1, SrcUnit=0,SrcTag=0,DstNode=3,DstUnit=3, Addr='hfe100ccc38,Addr Type=AT_PCI_Conf, CycleType=1,Bus=12,Dev=25,Func=4, RegOfs='h38, Coherent=1,Isoc=0,Doubleword=1, Compat=0,MaskCount=0,Posted=0,Da ta='h0000 00000000000000000000000000000000000000 00000000000000000000000000000000000000 000000000000000000000000000 0000bae2761f]

The scalable coherent controller processes the input packet and outputs a modified version of the packet as its output (in this case sent to box3.horus). GlobalTag=24 is a system-generated (i.e., synthetic) global transaction tag in accordance with the present invention. The system-generated global transaction tag enables the input packet to be matched with a corresponding output packet. The system-generated global transaction tag is unique and useful because the packets have no spare bits in which to encode a global transaction tag within the packet. Thus, the present invention provides a means for computing and maintaining the global transaction tag in association with packets outside the DUT. An example of an output packet in accordance with the present invention, which correlates to the input packet above, is configured as:

Time 150->50 From system.box1.horus To system.box3.horus Pkt [0a2fe100ccc3801e38d]:

[GlobalTag=24,Command=Cmd_WrSized,SrcNode=3, SrcUnit=2,SrcTag=1, DstNode=7,DstUnit=0, Addr='hfe100ccc38,AddrType=AT_PCI_Conf CycleType=1,Bus=12,Dev=25,Func=4,RegOfs='h38,Coherent=1,Isoc=0,Doublewor d=1,Compat=0, MaskCount=0,Posted=0,Data='h000000000000 00000 00000000000000000000000000000000000000000 00000000000000000000000000000000000000000 0000000000000000000bae2761f]

The global transaction tag is an external, system-generated packet identifier (e.g., a GlobalTag field) that is provided in a human readable form (e.g., printed) when a simulation reports on packets in a transaction. Accordingly, the global transaction tag enables both humans and tools to identify and correlate individual packets throughout an entire transaction. The global transaction tag is unique with respect to other fields in a packet in that it doesn't exist as a physical field within the packet.

FIG. 1 depicts an embodiment of a simulation manager 200 in accordance with the present invention. The global transaction tag manager 205 is connected to a conventional transaction-oriented DUT topology 210. Through interconnection and interaction with the transaction-oriented DUT topology 210, the global transaction tag manager 200 provides implementation of synthesized global transaction tags (i.e., global transaction tags) in accordance with the present invention.

The transaction-oriented DUT topology 205 includes a first CPU (i.e., CPU_A), a second CPU (i.e., CPU_B), a first DUT (i.e., DUT_A) and a second DUT (i.e., DUT_B). CPU_A interacts with DUT_A, DUT_A interacts with DUT_B and DUT_B interacts with CPU_B. More specifically, CPU_A produces a packet and tags as 'SrcNode=A, SrcTag=B' (i.e., an output packet of CPU_A) and sends the output packet to DUT_A. DUT_A receives the output packet of CPU_A (i.e., input packet of DUT_A), retags it as 'SrcNode=C, SrcTag=D' (i.e., an output packet of DUT_A) during transaction processing and sends it to DUT_B. DUT_B receives the output packet of DUT_A (i.e., input packet of DUT_B), retags it as 'SrcNode=E, SrcTag=F' during transaction processing and sends it to CPU_B. In this manner, three localized transaction tag domains are established (i.e., local transaction tag domain 1: [CPU_A, DUT_A], local transaction tag domain 2: [DUT_A, DUT_B] and local transaction tag domain 3: [DUT_B, CPU_B]. A respective localized tag is only meaningful in an associated local transaction tag domain.

The global transaction tag manager 200 includes a global transaction tag generator 215, a tag remapping tracker 220 and a simulation environment visibility interface module 225. The global transaction tag generator 215 is interconnected with each one of the local transaction tag domains of the transaction-oriented DUT topology 210. The simulation environment visibility interface module 225 is interconnected to DUT_A and DUT_B of the transaction-oriented DUT topology 210. The tag re-mapping tracker 220 is connected between the global transaction tag generator 215 and the simulation environment visibility interface module 225.

DUT_A and DUT_B include respective transaction processing engines, which perform transaction processing for that particular DUT. For each processing engine, an input packet is processed by the respective transaction processing engine. The transaction processing engine maintains internal state information about a particular transaction. The internal state may be null for a particular transaction that transaction processing engine has not yet seen. The transaction processing engine applies a transformation based upon incoming packet and a transaction state to produce one or more output packets (e.g., Output Packet=F(input packet, internal state)). At least part of the transformation includes a localized transaction retagging (i.e., within the respective local transaction tag domain) of the input packet. Besides the localized transaction tag, the transaction processing engine may re-label other fields in the context of F(input packet, internal state). Accordingly, each transaction processing engine performs localized transaction tagging of the form: Output_Tag=$F_{retag}$ (Di, E, S(t)), where Di is the i'th Domain in the system, E is a specific transaction processing engine, and S(t) is the stored state for transaction t.

The tag remapping tracker 220 tracks localized tag re-mapping information for each local transaction tag domain. The simulation environment visibility interface module 225 provides the tag remapping tracker 220 visibility into each local transaction tag domain for garnishing such localized tag re-mapping information. Dependent upon the localized tag re-mapping information, the global transaction tag generator 215 appropriately associates (e.g., stamps) each packet in a transaction with a respective global transaction tag whereby global transaction tag information applied to an output packet for a particular transaction in a first localized transaction-tagging domain is re-applied to an output packet of a second localized transaction-tagging domain after the output packet is generated by the second localized transaction-tagging domain.

The localized transaction tagging in the general case may take on different retagging when the packet is targeted toward different domains. In the case of a scalable coherent controller with a plurality of interconnected processors, each coherent controller and associated processors defines a respective local transaction tag domain.

To facilitate implementation of global transaction tags in accordance with the present invention, the global transaction manager requires visibility into the localized retagging processes of the local transaction domains. This required visibility is provided by the simulation environment visibility interface module 225 and is tracked via the tag remapping tracker 220. In one embodiment, the simulation environment visibility interface module 225 includes two interfaces to provide required visibility into the localized retagging processes of the local transaction domains. A first interface (i.e., Update (Engine E in input domain Di, Input tag(s), Output domain Do, Output tags from $F_{retag}$(Di, E, S(t)))) sets a current local tag that is tracked and a second interface (i.e., Deallocate (Engine E in input domain Di, Input tag(s))) invalidates tracking of the current local tag being tracked.

In the case of a Horus scalable coherent controller, the resulting procedures for the interfaces are of the form:
Update(engine.QuadID, engine.NodeID, engine.UnitID, engine.EntryID, entry.SrcQuadID, entry.SrcNodeID, entry.SrcUnitID, entry.SrcTag, entry.Address); and
Deallocate(engine.QuadID, engine.NodeID, engine.UnitID, engine.EntryID).

Each DUT may have multiple protocol processing engines, each with its own tag remapping domain. As a packet enters a DUT, the simulation environment computes which protocol processing engine the packet will enter. As the packet is processed by that engine, that engine becomes essentially a domain crossing, meaning that the (SrcNode, SrcTag) maps on the input side of that engine are different than the (SrcNode, SrcTag) maps on the output side of that engine. Accordingly, the simulation environment needs to have visibility into the remappings that are done in each transaction processing engine (i.e. each tag remapping domain crossing).

The Update( ) and Deallocate( ) interfaces jointly represent one such approach for providing sufficient visibility from the DUT simulation to the simulation environment to the current temporal state of the remapping tables. In the case of the transaction-oriented DUT topology 205 depicted in FIG. 1, if a packet that is locally tagged as (SrcNode=A, SrcTag=B) is seen entering an Engine A of DUT_A the global transaction tag manager 200 uses its observability of the current temporal remappings being done by Engine A to compute that this packet will get remapped to local tag (SrcNode=G, SrcTag=D). In this manner, the tag remapping tracker 220 is able to track localized packet retagging across all the engines across all the of the tag domains. Thus when the simulation sees a packet leave DUT_A with this local tag, the global transaction tag generator 215 can assign the same global transaction tag to both the input and output packets, even though their internal local tags are completely different. Prior to entering another. DUT the global transaction tag is stripped from the output packet (i.e., the input packet for the next DUT). In one embodiment, assigning the global transaction tag to a packet includes stamping (i.e., applying) the global transaction tag to a packet.

This process of determining an appropriate global transaction tag, assigning that global transaction tag to a packet and stripping the global transaction tag is repeated as the packet enters and emerges from each DUT in a transaction-oriented DUT topology. Thus, the present invention provides for global tracking of packets through a simulation environment via synthesized (i.e., system generated) global transaction tags. More specifically, the present invention provides for tracking of localized tag re-mapping information in devices bridging transaction-tagging domains for enabling association of a local tag of an input packet from one transaction-tagging domain with the local tag of a corresponding output packet (i.e., the retagged input packet) entering into another transaction-tagging domain. Accordingly, a skilled person will understand that a global transaction tag in accordance with the present invention is a unique identifier that is used for identifying all packets associated with a particular transaction globally across a plurality of localized transaction-tagging domains.

Tracking and prediction of transaction-oriented hardware packets via synthesized global transaction tags in accordance with the present invention is extendable from the simulation environment to the lab debug environment for hardware components such as, for example, ASICs. In the case of Horus, a scalable coherent controller DUT is attached to a plurality of processors (e.g., AMD brand Opteron processors). The processors have the ability to trace HyperTransport (HT) traffic into reserved local memory (i.e., trace data). Each of the processors is connected to a specific Horus, thus representing a localized transaction-tagging domain for that Horus. The trace data is retrievable the reserved local memory for determining the correspondence among localized transaction tags in different Horuses (i.e., different tagging domains).

In this manner, a Horus topology is analogous to a transaction-oriented DUT in a software simulation environment. Packet visibility is provided for in each individual transaction tag domain, but without a mechanism to unify the individual packets into global transactions. In the case of a scalable coherent controller such as Horus, the present invention extends debug tracing mode with the ability to get the protocol processing engine state for individual transactions.

Through instructions configured for providing, analogous functionality to software simulation in accordance with the present invention (i.e., as discussed in view of FIG. 1), a trace data post processing utility is configured for providing useful, novel and advantageous lab bring-up functionality. Examples of such useful functionalities include, but are not limited to, extracting coherent HT trace data from each processor connected to the coherent controller, receiving tag-remapping notification from the Horns trace data for each Horns and applying tag re-mapping transformations to each domain crossing to synthesize global transaction tags for each packet for enabling creation of system global transaction logs. Examples of specific instructions include, but are not limited to, instructions configured for facilitating extraction and analysis of trace data from the first one of a plurality of processors connected to a coherent controller for identifying the output packet from among the plurality of packets of different ones of the processors, instructions configured for facilitating analysis of an output packet for determining presence of transaction state information carried by the output packet and instructions configured for facilitating organizing transaction information of output packets with transaction information of other output packets dependent upon system-generated global transaction tags of said output packets thereby enabling creation of a system global transaction log for the plurality of scalable coherent controllers and processors.

More specifically, the trace data post processing utility is configured for accessing trace data associated with a scalable coherent controller and a plurality of processors connected to the scalable coherent controller. The scalable coherent controller implements an interface between a plurality of localized transaction-tagging domains. The trace data post processing utility comprises instructions configured for facilitating determination of associated transaction state from the local tag of the input packet from a first localized transaction-tagging domain (i.e. the first localized transaction tag) and instructions configured for facilitating assignment of a new local tag to any output packets entering into a second localized transaction-tagging domain (i.e. the second localized transaction tag). Facilitating assignment of the second localized transaction tag is performed in response to successfully performing determination of the transaction associated with the first localized transaction tag.

In summary, as ASICs gain complexity, human debuggability of simulations becomes a core concern. Many types of ASIC simulations have significant randomness in their stimulus (to gain coverage), may have large run-times, and have complex processing, resulting in simulations that are very complex to debug when simulation output mismatches occur. Increasing the debuggability of simulations becomes a core contributor to the productivity of the ASIC development team.

Constrained random simulation is the modern approach to high-end ASIC simulation. For simpler ASICs, one could imagine developing test cases or test vectors to test all the features/functions of an ASIC. More specifically, an individual would create highly specific scenarios and inputs to a DUT and usually know very simply what the DUT should do for this very directed test. In modern high-end ASIC simulation, the trend is to develop few specific directed test cases. The reason for this trend is that the complexity of the ASICs is so high that a human could not conceive of all the combinations of scenarios and corner cases that could occur and cause problems. So, the common approach is to try to randomize the internal state of the DUT, and then try to create highly stressful, constrained random stimulus to the DUT. Constrained random in the context of the present invention means that the simulation environment will create random scenarios (topologies, configuration), random packet stimulus sequences to the DUT, random packet contents, and random low-level physical signalling to the DUT. In this manner, given enough simulation cycles, the DUT will be stressed in ways that a human would not conceive and/or effectively model.

This approach to ASIC simulation provides for a very complex debug environment because a human did not consciously create the test scenario and therefore cannot predict the output. However, the simulation environment needs to have a sufficiently detailed model of the DUT so that it can precisely predict what the DUT should do against this highly randomized stimulus. The present invention solves one key aspect of this simulation debug complexity by enabling disparate packets to be tied together into a cohesive transaction that a human can understand.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for facilitating tracking of packets through a plurality of localized transaction-tagging domains, comprising:
    determining a local tag applied by a device under test of a first localized transaction-tagging domain to an output packet of the device test, wherein the output packet is generated by the device under test using at least a portion of information carried within an input packet thereof wherein a local tag of the input packet is different than the local tag of the output packet, wherein the input packet has a system-generated global transaction tag associated therewith and wherein the output packet includes information relating to a transaction associated with a device under test simulation that is carried out across the plurality of tagging domains; and
    applying the system-generated global transaction tag associated with the input packet to the output packet in response to correlating the local tag of the output packet with the local tag of input packet, wherein the global transaction tag is a unique identifier that identifies all packets associated with the transaction globally across the plurality of localized transaction-tagging domains whereby said global transaction tag enables unification of a plurality of disparate packets associated with the device under test simulation.

2. The method of claim 1 wherein applying said global transaction tag is performed after completion of transformation actions of the device under test that result in the output packet being generated by the device under test using at least a portion of said information carried within the input packet.

3. The method of claim 1, further comprising:
    stripping said global transaction tag from the output packet thereby creating an input packet to be processed by a device under test of a second localized transaction-tagging domain, wherein said stripping is performed after the output packet emerges from the device under test of the first localized transaction-tagging domain; and
    applying said global transaction tag to an output packet of the second localized transaction-tagging domain after the output packet of the second transaction-tagging domain is generated by the device under test of the second localized transaction-tagging domain and emerges from the device under test of the second localized transaction-tagging domain.

4. The method of claim 1 wherein said determining the local tag applied by the device under test of the first localized transaction-tagging domain includes tracking localized packet retagging performed within the device under test of the first localized transaction-tagging domain for enabling association of the local tag of input packet with the local tag of the output packet.

5. The method of claim 4 wherein:
    said determining includes matching the local tag of the output packet with the local tag of the input packet; and
    said applying is performed in response to successful completion of said matching.

6. The method of claim 1 wherein:
    said determining the local tag applied by the device under test of the first localized transaction-tagging domain includes tracking transformation actions of the device under test that result in the output packet being generated by the device under test using at least a portion of said information carried within the input packet.

7. A method for facilitating tracking of packets through a plurality of processors each connected to a respective one of a plurality of scalable coherent controllers, each one of said scalable coherent controllers and said interconnected processors represents a localized transaction-tagging domain, the method comprising:
    determining a local tag applied by a first scalable coherent controller to an output packet of the first scalable coherent controller, wherein the output packet is generated by the first scalable coherent controller using at least a portion of information carried within an input packet thereof, wherein a local tag of the input packet is different than the local tag of the output packet, wherein the input packet has a system-generated global transaction tag associated therewith and wherein the output packet includes information relating to a transaction carried out across a plurality of localized transaction-tagging domains; and
    applying the system-generated global transaction tag associated with the input packet to the output packet in response to correlating the local tag of the output packet with the local tag of the input packet, wherein the global transaction tag is a unique identifier that identifies all packets associated with the transaction globally across the plurality of localized transaction-tagging domains whereby said global transaction tag enables unification of a plurality of disparate packets associated with the transaction.

8. The method of claim 7, further comprising:
    extracting trace data associated with the first one of said processors, wherein said extracting includes analyzing a plurality of packets for identifying output packets from the first one of said processors.

9. The method of claim 7, further comprising:
    analyzing a plurality of packets for identifying the output packet from among the packets of a second scalable coherent controller.

10. The method of claim 7, further comprising:
    organizing transaction information of the output packet with transaction information of other output packets dependent upon system-generated global transaction tags of said other output packets thereby enabling creation of a system global transaction log for the plurality of scalable coherent controllers and processors.

11. The method of claim wherein:
    said determining the local tag includes tracking localized tag packet retagging performed within the first scalable coherent controller;

said determining the local tag includes matching the local tag of the output packet with the local tag of the input packet; and said applying is performed in response to successful completion of said matching.

12. The method of claim 11, further comprising:

extracting trace data associated with the first one of said processors, wherein said extracting includes identifying output packets from the first one of said processor; and organizing transaction information of an output packets with transaction information of other output packets dependent upon system-generated global transaction tags of said output packets thereby enabling creation of a system global transaction log for a plurality of scalable coherent controllers and processors.

13. A trace data post processing utility configured for accessing trace data associated with a sealable coherent controller and a plurality of processors connected to the scalable coherent controller, the scalable coherent controller implements an interface between localized transaction-tagging domains, said trace data post processing utility comprising:

instructions configured for facilitating determination of a local tag applied by a first scalable coherent controller to an output packet of the first scalable coherent controller, wherein the output packet is generated by the first scalable coherent controller using at least a portion of information carried within an input packet thereof, wherein a local tag of the input packet is different than the local tag of the output packet, wherein the input packet has a system-generated global transaction tag associated therewith and wherein the output packet includes information relating to a transaction carried out across a plurality of localized transaction tagging domains; and instructions configured for facilitating application of the system generated global transaction tag associated with the input packet to the output packet in response to correlating the local tag of the output packet with the local tag of the input packet, wherein the global transaction tag is a unique identifier that identifies all packets associated with the transaction globally across the plurality of localized transaction-tagging domains whereby said global transaction tag enables unification of a plurality of disparate packets associated with the transaction.

14. The trace data post processing utility of claim 13 wherein applying said global transaction tag is performed after completion of transformation actions of the first scalable coherent controller that result in the output packet being generated by the first scalable coherent controller using at least a portion of said information carried within the input packet.

15. The trace data post processing utility of claim 14, further comprising:

instructions for stripping said global transaction tag from the output packet thereby creating an input packet to be processed by a second scalable coherent controller, wherein said stripping is performed after the output emerges from the first scalable coherent controller; and instructions configured for facilitating application of said global transaction tag to an output packet of a second scalable coherent controller after the output packet of the second scalable coherent controller is generated by the second scalable coherent controller and emerges from the second scalable coherent controller.

16. The trace data post processing utility of claim 13 wherein the global transaction tag is a unique identifier that identifies all packets associated with a particular transaction globally across a plurality scalable coherent controllers and processors.

17. The trace data post processing utility of claim 13 wherein said instructions configured for facilitating determination includes instructions configured for facilitating tracking of localized packet re-tagging within the first scalable coherent controller for enabling the local tag applied by the first scalable coherent controller to the output packet to be associated with the local tag of the input packet.

18. The trace data post processing utility of claim 17 wherein:

said determination includes matching the local tag of the output packet with the local tag of the input packet; and said applying is performed in response to successful completion of said matching.

19. The trace data post processing utility of claim 13 wherein:

said instructions configured for facilitating determination include instructions configured for facilitating tracking of transformation actions of the first scalable coherent controller that result in the output packet being generated by the first scalable coherent controller using at least a portion of said information carried within the input packet.

* * * * *